(12) United States Patent
Benstead

(10) Patent No.: US 7,699,241 B2
(45) Date of Patent: Apr. 20, 2010

(54) DOCKING COLLAR FOR A PULL-OUT SPRAY HEAD

(75) Inventor: Evan A. Benstead, Los Angeles, CA (US)

(73) Assignee: Newfrey LLC, Newark, DE (US)

( * ) Notice: Subject to any disclaimer, the term of this patent is extended or adjusted under 35 U.S.C. 154(b) by 580 days.

(21) Appl. No.: 11/585,444

(22) Filed: Oct. 24, 2006

(65) Prior Publication Data

US 2007/0040380 A1  Feb. 22, 2007

(51) Int. Cl.
B05B 17/00 (2006.01)
A62C 31/02 (2006.01)

(52) U.S. Cl. .............................. 239/1; 239/589; 239/600

(58) Field of Classification Search .................. 239/1, 239/589, 590, 591, 600; 285/305, 319, 320, 285/330, 417, 328, 332; 4/678, 675, 676, 4/615
See application file for complete search history.

(56) References Cited

U.S. PATENT DOCUMENTS

| | | | |
|---|---|---|---|
| D40,106 S | 6/1909 | Yacoobian | |
| D76,995 S | 11/1928 | Fraser | |
| D83,923 S | 4/1931 | Sakier | |
| D87,829 S | 9/1932 | Ferguson | |
| D87,830 S | 9/1932 | Ferguson | |
| D186,012 S | 8/1959 | Sosnick | |
| D266,348 S | 9/1982 | Piesco | |
| D277,537 S | 2/1985 | Merl et al. | |
| D287,395 S | 12/1986 | Piesco | |
| D287,747 S | 1/1987 | Miller et al. | |
| D295,550 S | 5/1988 | Yost | |
| D295,551 S | 5/1988 | Yost | |
| D297,758 S | 9/1988 | Paul | |
| D299,852 S | 2/1989 | Paul | |
| D299,853 S | 2/1989 | Paul | |
| D299,854 S | 2/1989 | Paul | |
| D301,919 S | 6/1989 | Paul | |
| D302,202 S | 7/1989 | Paul | |
| D302,582 S | 8/1989 | Paul | |
| D302,849 S | 8/1989 | Kohler, Jr. et al. | |
| D312,681 S | 12/1990 | Kohler, Jr. et al. | |
| D316,747 S | 5/1991 | Fleischmann | |
| D318,099 S | 7/1991 | Reid et al. | |
| D318,714 S | 7/1991 | Spangler | |
| D318,717 S | 7/1991 | Spangler | |
| D318,906 S | 8/1991 | Spangler | |
| D320,434 S | 10/1991 | Rawald | |
| D321,039 S | 10/1991 | Robbins | |
| D325,426 S | 4/1992 | Paul | |
| D325,427 S | 4/1992 | Paul | |
| D325,772 S | 4/1992 | Carr | |
| D325,773 S | 4/1992 | Paul | |
| D326,504 S | 5/1992 | Robbins | |
| D327,531 S | 6/1992 | Ko | |
| D327,532 S | 6/1992 | Ko | |

(Continued)

*Primary Examiner*—Davis Hwu
(74) *Attorney, Agent, or Firm*—Richard J. Veltman; John D. DelPonti

(57) ABSTRACT

A faucet includes a spout having a first mounting device and a spray head having a second mounting device. A docking collar is provided for releasably mounting the spray head to the spout. The docking collar is connected to one of the first mounting device and the second mounting device. The docking collar includes a spring ring for releasably engaging a groove formed at an other of the first mounting device and the second mounting device.

14 Claims, 3 Drawing Sheets

U.S. PATENT DOCUMENTS

| | | |
|---|---|---|
| D332,135 S | 12/1992 | Bonnell |
| D334,230 S | 3/1993 | Bonnell |
| D340,968 S | 11/1993 | McKeone et al. |
| D347,268 S | 5/1994 | Paul |
| D348,307 S | 6/1994 | Gottwald |
| D349,155 S | 7/1994 | McKeone et al. |
| D350,390 S | 9/1994 | Bollenbacher |
| D352,767 S | 11/1994 | McKeone |
| D353,653 S | 12/1994 | McKeone |
| D356,631 S | 3/1995 | Kolada |
| D357,305 S | 4/1995 | Fabian |
| D357,525 S | 4/1995 | Fabian |
| D357,730 S | 4/1995 | Saperstein |
| D363,536 S | 10/1995 | Hill et al. |
| D364,219 S | 11/1995 | Hill et al. |
| D364,220 S | 11/1995 | Hill et al. |
| D365,384 S | 12/1995 | Robbins |
| D366,099 S | 1/1996 | Hill et al. |
| D367,920 S | 3/1996 | Hill et al. |
| D368,767 S | 4/1996 | Gottwald |
| D371,826 S | 7/1996 | Robbins |
| D372,299 S | 7/1996 | Fabian |
| D372,300 S | 7/1996 | Fabian |
| D372,764 S | 8/1996 | Dubin |
| D377,517 S | 1/1997 | Doughty et al. |
| D378,231 S | 2/1997 | Dubin |
| D379,849 S | 6/1997 | Hill et al. |
| D383,831 S | 9/1997 | Esche et al. |
| D385,955 S | 11/1997 | Hundley et al. |
| D388,864 S | 1/1998 | Fabian |
| 5,718,464 A * | 2/1998 | Mark ................... 285/321 |
| D393,054 S | 3/1998 | Doughty et al. |
| D394,492 S | 5/1998 | Nguyen et al. |
| D398,963 S | 9/1998 | Donahue et al. |
| D402,005 S | 12/1998 | Ko |
| D404,470 S | 1/1999 | Pitsch et al. |
| D404,802 S | 1/1999 | Delker |
| D405,163 S | 2/1999 | Doughty et al. |
| D405,508 S | 2/1999 | Doughty et al. |
| D405,509 S | 2/1999 | Doughty et al. |
| D406,321 S | 3/1999 | Hundley et al. |
| D407,143 S | 3/1999 | Hyde et al. |
| D407,466 S | 3/1999 | Hundley et al. |
| D408,897 S | 4/1999 | Warshawsky |
| D409,292 S | 5/1999 | Hyde et al. |
| D414,845 S | 10/1999 | Hyde |
| D415,259 S | 10/1999 | Slothower |
| D417,262 S | 11/1999 | Caplow |
| D417,490 S | 12/1999 | Formgren |
| D418,204 S | 12/1999 | Garcia |
| D418,205 S | 12/1999 | Hyde et al. |
| D419,647 S | 1/2000 | Warshawsky |
| D421,642 S | 3/2000 | Ko |
| D421,789 S | 3/2000 | Delker et al. |
| D423,649 S | 4/2000 | Lobermeier |
| D425,968 S | 5/2000 | Lobermeier |
| D426,621 S | 6/2000 | Biller et al. |
| D426,872 S | 6/2000 | Milrud et al. |
| D426,873 S | 6/2000 | Milrud et al. |
| D428,118 S | 7/2000 | McKeone |
| D428,474 S | 7/2000 | Milrud et al. |
| D429,316 S | 8/2000 | McKeone |
| D429,318 S | 8/2000 | Spangler |
| D429,522 S | 8/2000 | Spangler |
| D429,523 S | 8/2000 | Spangler |
| D429,798 S | 8/2000 | Milrud et al. |
| D429,799 S | 8/2000 | Spangler |
| D429,800 S | 8/2000 | Spangler |
| D430,924 S | 9/2000 | Wei et al. |
| D433,103 S | 10/2000 | Spangler |
| D433,733 S | 11/2000 | Lord |
| D433,735 S | 11/2000 | Lord |
| D434,118 S | 11/2000 | Lord |
| D434,119 S | 11/2000 | Milrud et al. |
| D438,601 S | 3/2001 | Caplow |
| D438,602 S | 3/2001 | Milrud et al. |
| D439,954 S | 4/2001 | Spangler |
| D440,633 S | 4/2001 | Fleischmann |
| D441,058 S | 4/2001 | Fleischmann |
| D441,432 S | 5/2001 | Fleischmann |
| D441,433 S | 5/2001 | Spangler |
| D441,434 S | 5/2001 | Dretzka |
| D441,844 S | 5/2001 | Fleischmann |
| D442,676 S | 5/2001 | Dretzka |
| D443,678 S | 6/2001 | Lord |
| D443,920 S | 6/2001 | Lord |
| D444,543 S | 7/2001 | Fleischmann |
| D444,544 S | 7/2001 | Lord |
| D444,859 S | 7/2001 | Slothower |
| D444,860 S | 7/2001 | Slothower |
| D446,287 S | 8/2001 | Fleischmann |
| D447,542 S | 9/2001 | Dretzka |
| D448,067 S | 9/2001 | Pitsch |
| D448,456 S | 9/2001 | Lord |
| D455,196 S | 4/2002 | Caplow |
| D456,063 S | 4/2002 | McKeone |
| D456,879 S | 5/2002 | Doughty et al. |
| D458,344 S | 6/2002 | Müllenmeister |
| D458,346 S | 6/2002 | Müllenmeister |
| D458,347 S | 6/2002 | Müllenmeister |
| D458,349 S | 6/2002 | Müllenmeister |
| D458,667 S | 6/2002 | Gottwald |
| D458,989 S | 6/2002 | Müllenmeister |
| D459,791 S | 7/2002 | Yegyayan |
| D459,792 S | 7/2002 | Lai |
| D460,158 S | 7/2002 | Green et al. |
| D460,529 S | 7/2002 | Caplow |
| D460,531 S | 7/2002 | Ko |
| D460,533 S | 7/2002 | Singtoroj |
| D460,534 S | 7/2002 | Hanna et al. |
| D460,806 S | 7/2002 | Singtoroj |
| D460,807 S | 7/2002 | Singtoroj |
| D460,808 S | 7/2002 | Otero et al. |
| D461,229 S | 8/2002 | Hanna |
| D461,536 S | 8/2002 | Singtoroj |
| D461,541 S | 8/2002 | Singtoroj |
| D461,543 S | 8/2002 | Müllenmeister |
| D461,879 S | 8/2002 | Müllenmeister |
| D462,418 S | 9/2002 | Smith |
| D462,421 S | 9/2002 | Hundley |
| D462,749 S | 9/2002 | Lord |
| D463,012 S | 9/2002 | Otero et al. |
| D463,013 S | 9/2002 | Green et al. |
| D464,404 S | 10/2002 | Lord |
| D464,405 S | 10/2002 | Lord |
| D464,408 S | 10/2002 | Gottwald |
| D464,714 S | 10/2002 | Lord |
| D465,010 S | 10/2002 | Lord |
| D465,268 S | 11/2002 | Müllenmeister |
| D465,270 S | 11/2002 | Gottwald |
| D465,832 S | 11/2002 | Singtoroj |
| D465,834 S | 11/2002 | Singtoroj |
| D466,196 S | 11/2002 | Otero et al. |
| D466,197 S | 11/2002 | Singtoroj |
| D466,985 S | 12/2002 | McKeone |
| D467,316 S | 12/2002 | Otero et al. |
| D467,317 S | 12/2002 | Otero et al. |
| D467,318 S | 12/2002 | Otero et al. |
| D467,319 S | 12/2002 | Otero et al. |
| D467,320 S | 12/2002 | Yegyayan |
| D468,406 S | 1/2003 | Sacks et al. |
| D469,856 S | 2/2003 | Bouilloux et al. |
| D470,573 S | 2/2003 | Marshall |
| D470,574 S | 2/2003 | Marshall |

| | | |
|---|---|---|
| D470,575 S | 2/2003 | Marshall |
| D470,576 S | 2/2003 | Marshall |
| D470,922 S | 2/2003 | Marshall |
| D470,923 S | 2/2003 | Marshall |
| D470,925 S | 2/2003 | Blomstrom |
| D471,964 S | 3/2003 | Bates et al. |
| D473,932 S | 4/2003 | Caplow |
| D473,933 S | 4/2003 | Warshawsky et al. |
| D474,671 S | 5/2003 | Singtoroj et al. |
| D474,834 S | 5/2003 | Czerwinski, Jr. et al. |
| D474,957 S | 5/2003 | Singtoroj et al. |
| D475,438 S | 6/2003 | Tolosa |
| D475,766 S | 6/2003 | Tolosa |
| D475,767 S | 6/2003 | Yegyayan et al. |
| D477,057 S | 7/2003 | Schönherr et al. |
| D477,386 S | 7/2003 | Schönherr et al. |
| D477,860 S | 7/2003 | Singtoroj |
| D478,157 S | 8/2003 | Yegyayan |
| D478,375 S | 8/2003 | Hundley |
| D478,966 S | 8/2003 | Citterio |
| D479,311 S | 9/2003 | Veltz |
| D482,758 S | 11/2003 | Bates et al. |
| D482,759 S | 11/2003 | Otero |
| D482,760 S | 11/2003 | Fraser et al. |
| D483,093 S | 12/2003 | Bates et al. |
| D484,573 S | 12/2003 | Haug et al. |
| D484,950 S | 1/2004 | Blattner |
| D484,951 S | 1/2004 | Lin |
| D484,952 S | 1/2004 | Marshall |
| D486,563 S | 2/2004 | Hsieh |
| D487,132 S | 2/2004 | Zhao |
| D487,305 S | 3/2004 | Ouyoung |
| D487,499 S | 3/2004 | Zhao |
| D487,799 S | 3/2004 | Czerwinski, Jr. et al. |
| D487,916 S | 3/2004 | Lord |
| D487,917 S | 3/2004 | Lord |
| D487,923 S | 3/2004 | Fraser et al. |
| D487,924 S | 3/2004 | Lin |
| D487,925 S | 3/2004 | Lin |
| D488,539 S | 4/2004 | McKeone |
| D488,540 S | 4/2004 | Ouyoung |
| D488,541 S | 4/2004 | Lin |
| D488,542 S | 4/2004 | Spiegelberg et al. |
| D489,120 S | 4/2004 | Shieh |
| D489,432 S | 5/2004 | Lammel et al. |
| D490,501 S | 5/2004 | Ouyoung |
| D490,502 S | 5/2004 | Ouyoung |
| D490,503 S | 5/2004 | Fraser et al. |
| D490,504 S | 5/2004 | Lin |
| D490,879 S | 6/2004 | Lin |
| D490,881 S | 6/2004 | Lin |
| D491,633 S | 6/2004 | Ouyoung |
| D491,637 S | 6/2004 | Lin |
| D491,638 S | 6/2004 | Lin |
| D491,639 S | 6/2004 | Egee |
| D491,640 S | 6/2004 | Lin |
| D491,641 S | 6/2004 | Lin |
| D491,642 S | 6/2004 | Lin |
| D492,009 S | 6/2004 | Egee |
| D492,013 S | 6/2004 | Citterio |
| D492,387 S | 6/2004 | Pohl et al. |
| D492,981 S | 7/2004 | Bloomstrom |
| D493,213 S | 7/2004 | Svendsen et al. |
| D495,402 S | 8/2004 | Spiegelberg et al. |
| D496,717 S | 9/2004 | Svendsen et al. |
| D497,198 S | 10/2004 | Painter et al. |
| 6,845,526 B2 * | 1/2005 | Malek et al. ............ 4/678 |

* cited by examiner

LER FOR A PULL-OUT
SPRAY HEAD

BACKGROUND OF THE INVENTION

1. Field of the Invention

The present invention relates to a faucet, and, more particularly, to a docking collar for a pull-out spray head.

2. Description of the Related Art

A docking collar may be used to releasably mount a pull-out spray head to a spout of a faucet. Typically, the docking collar includes a plurality of cantilevered, flexible snap fingers which are engageable with recesses or the like in a portion of the pull-out spray head which fits into the collar. The snap fingers rely on the inherent resiliency of the plastic material of which the collar is made to produce a retaining force. This retaining force, while enough to hold the spray head on the spout, can be overcome when a user wishes to release the spray head from the spout. Release of the spray head is achieved by pulling outwardly or downwardly on the spray head until the snap fingers are forced to flex out of the mating recesses.

One problem with such a snap finger arrangement is that the retention force is produced solely by the flexibility of the cantilevered fingers. One attempt to overcome this problem is to place an elastomeric O-ring at a point where the O-ring surrounds and engages the snap fingers to bias the snap fingers toward the recesses in a portion of the pull-out spray head. However, such a design still relies on the engagement of the plurality of snap fingers with the recesses associated with the pull-out spray head to retain the spray head in a mounted relationship with the spout.

SUMMARY OF THE INVENTION

The present invention, in one form thereof, is directed to a faucet. The faucet includes a spout having a first mounting device and a spray head having a second mounting device. A docking collar is provided for releasably mounting the spray head to the spout. The docking collar is connected to one of the first mounting device and the second mounting device. The docking collar includes a spring ring for releasably engaging a groove formed at an other of the first mounting device and the second mounting device.

The present invention, in another form thereof, is directed to a kit for releasably mounting a spray head to a spout. The kit includes a first device, a second device and a spring ring. The first device has a first end and a second end. The first end has a first connector for connecting to one of the spray head and the spout, and the second end has an exterior groove. The second device has a second connector for connecting to an other of the spray head and the spout. The second device has an outer periphery and an interior opening defined by at least one slot. The second device has an annular channel formed at the outer periphery that extends to the slot. The spring ring is provided for insertion into the annular channel. An interior circumference of the spring ring extends into the slot with a compressive force to engage the exterior groove of the first device when the first device and the second device are docked.

The present invention, in another form thereof, is directed to a method for releasably mounting a spray head to a spout, including providing a first device at one of the spray head and the spout, the first device having a distal end having an exterior groove; providing a second device at an other of the spray head and the spout, the second device having an outer periphery and an interior opening defined by at least one slot, the second device having an annular channel formed at the outer periphery that extends to the slot; positioning a spring ring in the annular channel; and inserting the distal end of the first device into the interior opening of the second device until the spring ring collapses into the exterior groove of the first device.

An advantage of the present invention is that it provides a retention mechanism for the spray head without the use of a plurality of snap fingers.

Another advantage of the present invention is that it provides a retention mechanism for the spray head, such that the spray head will easily orient cosmetically to the faucet spout.

Another advantage of the present invention is that the spray head will make a "clicking" noise when docked.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate an embodiment of the invention, in one form, and such exemplifications are not to be construed as limiting the scope of the invention in any manner.

DETAILED DESCRIPTION OF THE INVENTION

Figure 1:
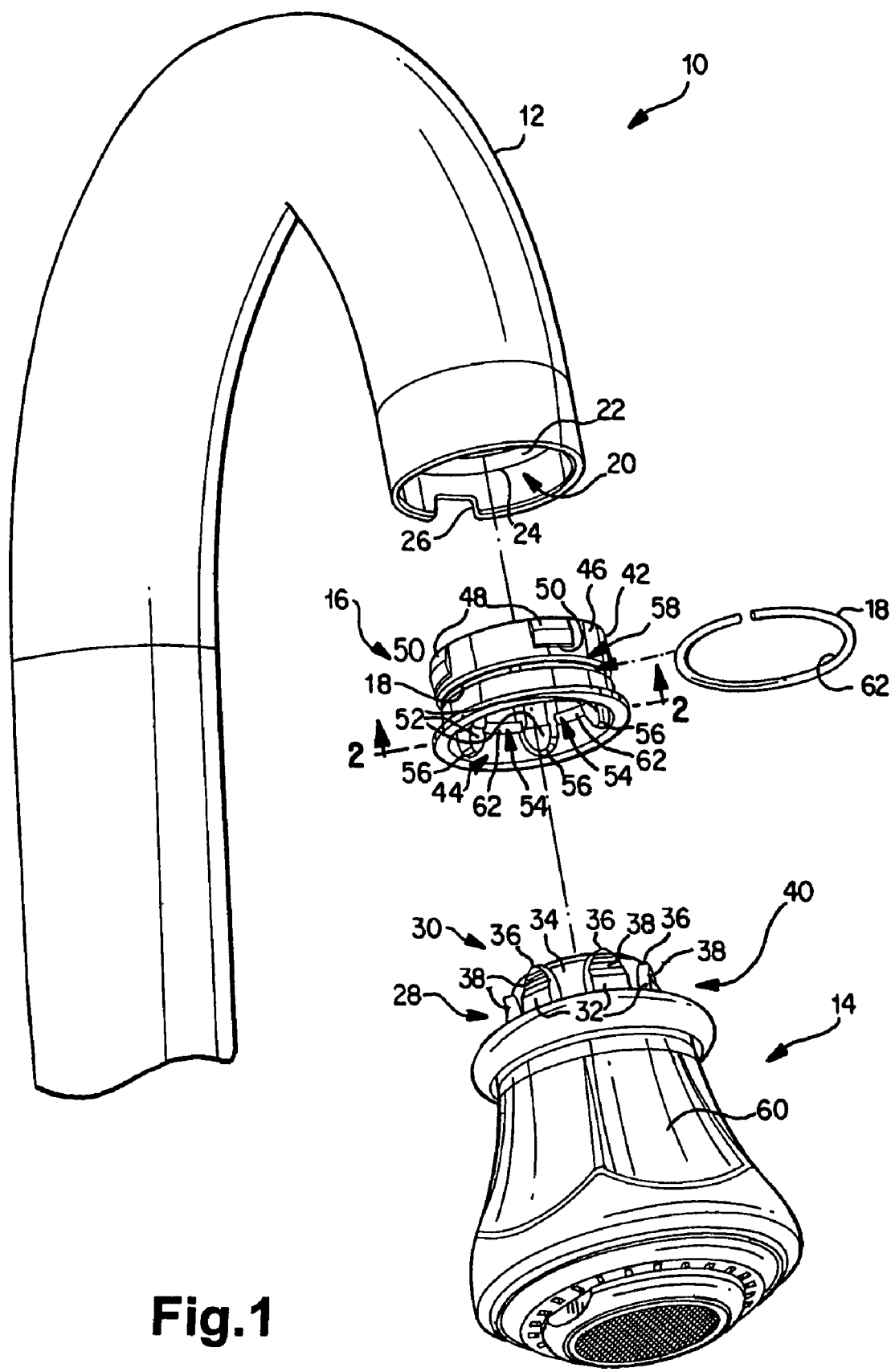
FIG. 1 is an exploded perspective view of a faucet configured in accordance with an embodiment of the present invention.
Figure 2:
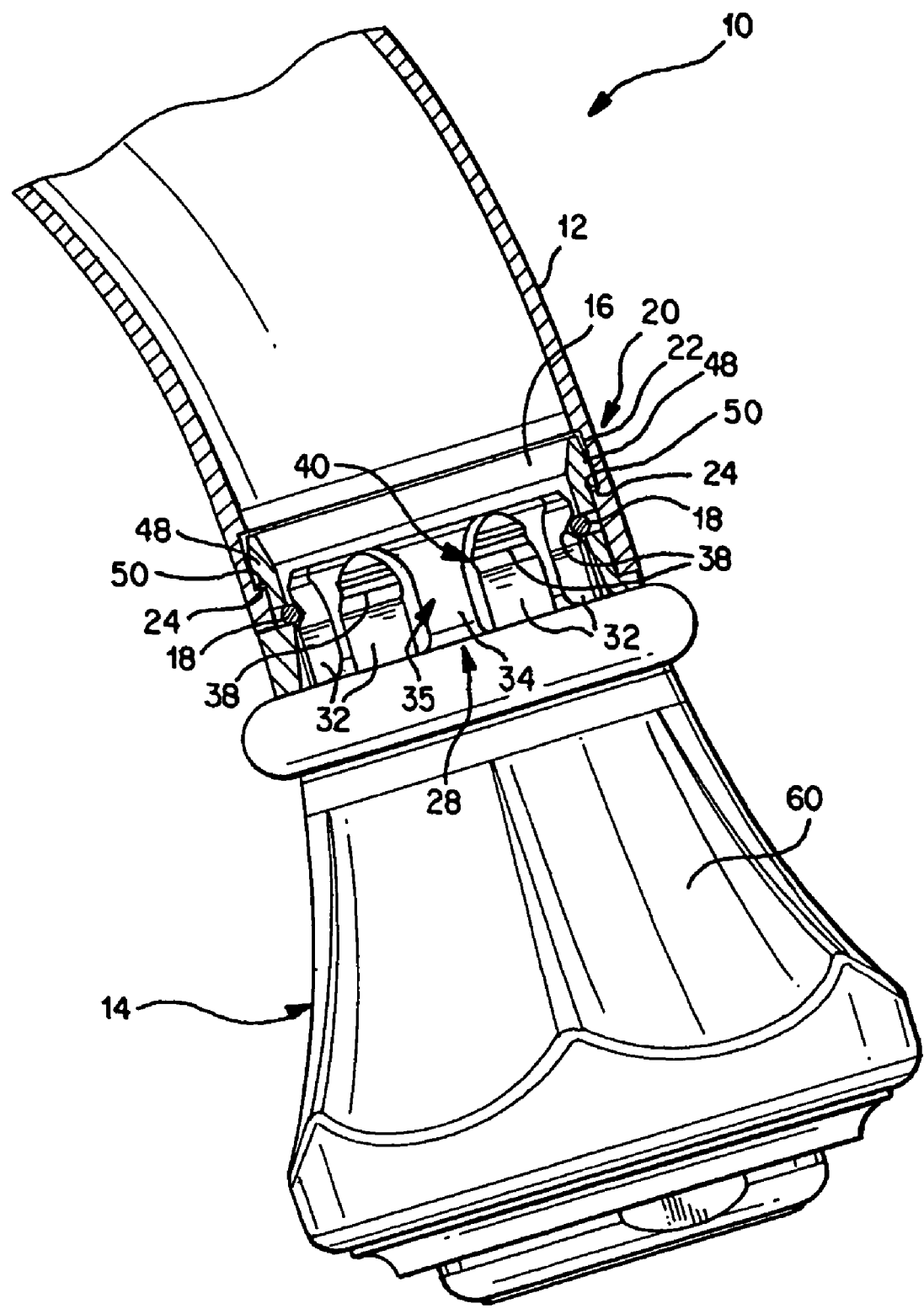
FIG. 2 is a partial sectional view of the faucet of FIG. 1 taken along line 2-2.

Referring now to FIGS. 1 and 2, there is shown a faucet 10 configured in accordance with the present invention. Faucet 10 includes a spout 12, a spray head 14, a docking collar 16, and a spring ring 18. Spring ring 18 is also shown projected from docking collar 16 in a top view in FIG. 1.

As can be best seen in FIG. 2, spout 12 has a mounting device 20 in the form of an internal annular slot 22. Annular slot 22 has an outer edge 24 for receiving a connecting portion of docking collar 16. Also, spout 12 includes a keyway 26 (see FIG. 1) for receiving a positioning key (not shown) of docking collar 16.

Spray head 14 has a mounting device 28 configured for removable engagement with docking collar 16. Mounting device 28 has a distal end 30 that includes a plurality of spaced protrusions 32 formed around an outer periphery 34 of mounting device 28, and with a slot 35 formed between each adjacent pair of the plurality of spaced protrusions 32. In one embodiment, for example, the number of protrusions 32 is selected to be six. This number, however, may be varied depending on design factors associated with the particular spout/spray head arrangement.

Each of the plurality of protrusions 32 has a tapered end 36 defining a lead-in angle to aid in docking spray head 14 with spout 12. Mounting device 28 may be formed integral with spray head 14, or may be formed as a separate part, such as an adapter, that is attached to the spray head. For example, spray head 14 may have a threaded male connector and mounting device 28 may have a threaded female connector. In any event, mounting device 28 is considered to be a part of spray head 14. Mounting device 28 includes a groove 38 formed in each of the plurality of protrusions 32 to define an exterior annular recess 40. Groove 38 may be located, for example, half way down the length of each of the plurality of protrusions 32.

Those skilled in the art will recognize that, as an alternative to the configuration of spout 12 and spray head 14 described above, if desired, the locations of mounting device 20 and mounting device 28 may be reversed, such that mounting device 28 is included with spout 12 and mounting device 20 is included with spray head 14.

Referring again to FIG. 1, docking collar 16 includes a body 42 having an interior opening 44. Body 42 may be formed, for example, from plastic. An outer periphery 46 of body 42 includes a plurality of tapered members 48, each having a latch surface 50 that is positioned to engage outer edge 24 of the annular slot 22 of mounting device 20, which in this example, is formed in spout 12. A plurality of protrusions 52 and an alternating plurality of slots 54 are formed around an inner periphery of interior opening 44. Each of the plurality of protrusions 52 has a tapered end 56 defining a lead-in angle to aid in docking spray head 14 with spout 12.

An annular channel 58 is formed at an outer periphery 46 of body 42. Annular channel 58 extends from outer periphery 46 inwardly into the plurality of protrusions 52, such that annular channel 58 extends to the plurality of slots 54. In other words, the space devoid of material defined by annular channel 58 joins the space devoid of material defined by the plurality of slots 54 between the plurality of protrusions 52.

Distal end 30 of mounting device 28 of spray head 14 is sized for snug sliding insertion into interior opening 44 of body 42 of docking collar 16. When spray head 14 is mounted to spout 12, the plurality of protrusions 32 of distal end 30 of mounting device 28, e.g., of spray head 14, are interlaced with the plurality of protrusions 52 of docking collar 16. The tapered ends 56 of the plurality of protrusions 52 of docking collar 16 and the tapered ends 36 of the plurality of protrusions 32 of distal end 30 of mounting device 28 aid in interlacing the plurality of protrusions 52 with the plurality of protrusions 32 during insertion by guiding the plurality of protrusions 32 of distal end 30 of mounting device 28 into the corresponding plurality of slots 54 of docking collar 16. As such, spray head 14 may be rotated to a desired position, and the position maintained by the engagement of the plurality of protrusions 32 with the plurality of slots 54 of docking collar 16 when spray head 14 is mounted to spout 12, thus clocking spray head 14 to a desired rotational position with respect to spout 12. The effect is such that, for example, one of the plurality of facets 60 of spray head 14 will always face forward.

Spring ring 18 is positioned in annular channel 58 of docking collar 16. When spring ring 18 is in position in annular channel 58, an interior circumference 62 of spring ring 18 extends into each of the plurality of slots 54, as shown in FIG. 1. Spring ring 18 may be, for example, a resilient split metal ring, and may be formed from steel. Spring ring 18 applies an inward compressive force which, when engaged with groove 38 formed in each of the plurality of protrusions 32, i.e., when engaged with exterior annular recess 40, releasably retains distal end 30 of mounting device 28 of spray head 14 in a mounted relationship. Thereafter, spring ring 18 remains releasably engaged with exterior annular recess 40 of distal end 30, i.e., groove 38 formed in each of the plurality of protrusions 32, until acted upon by an outside force, such as by a user grasping spray head 14 and pulling, or by applying a side force to spray head 14, to release spring ring 18 from annular recess 40.

In accordance one aspect of the present feature, a kit may be formed that includes mounting device 28, docking collar 16 and spring ring 18. For example, mounting device 28 may be configured having a connector, e.g., threads, for connecting to one of spout 12 and spray head 14, and having distal end 30 that includes exterior groove 38. Docking collar 16 has a connector, e.g., tapered members 48, for connecting to the other of spout 12 and spray head 14, and may be configured as described above, including annular channel 58 and at least one slot 54. Spring ring 18 is provided for insertion into annular channel 58, wherein interior circumference 62 of spring ring 18 extends into the slot 54 with a compressive force to engage exterior groove 38 of mounting device 28 when mounting device 28 and docking collar 16 are docked.

Figure 3:
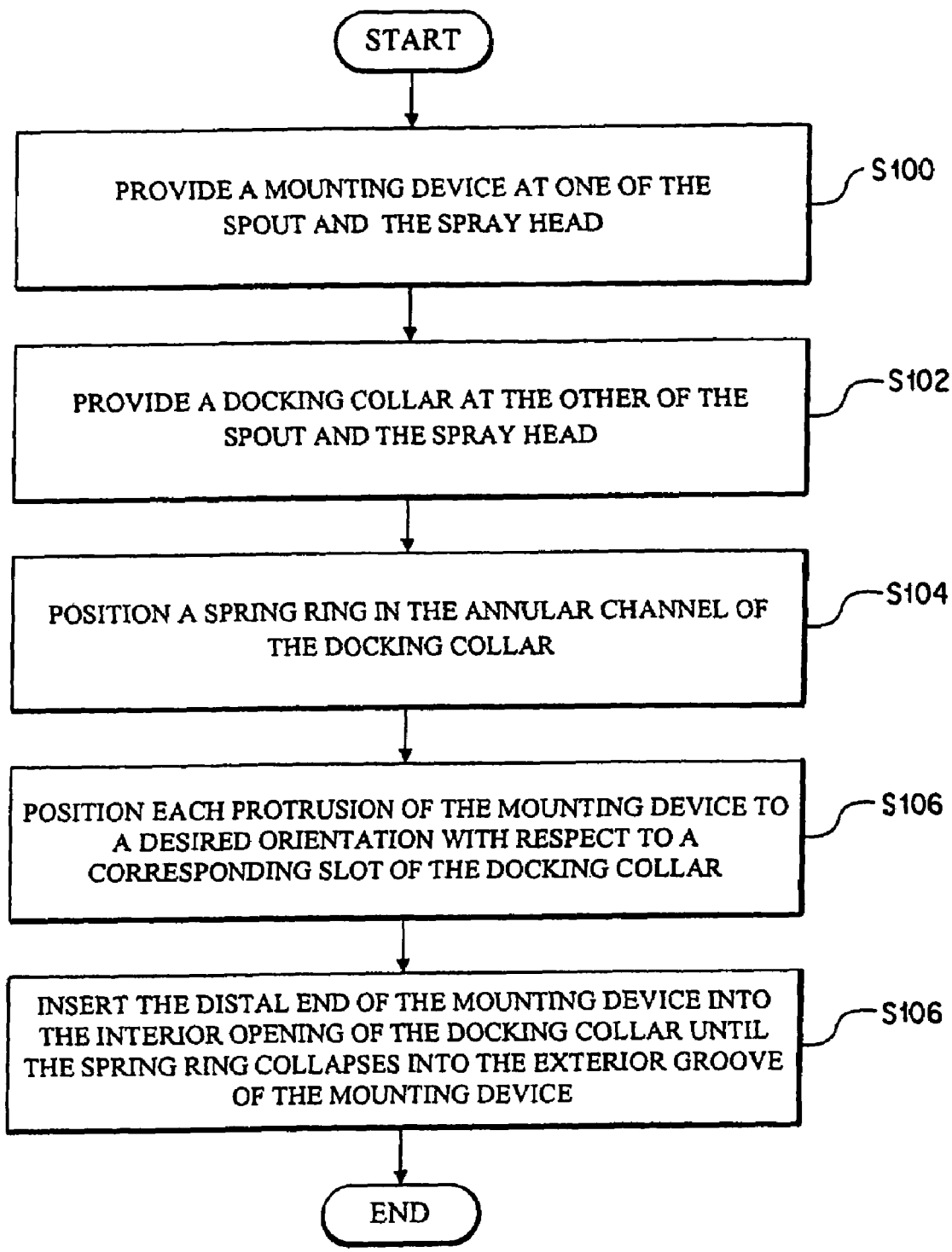
FIG. 3 is a general flowchart of a method for releasably mounting a spray head in accordance with an embodiment of the present invention.

FIG. 3 is a general flowchart of a method for releasably mounting spray head 14 to spout 12, in accordance with an embodiment of the present invention.

At step S100, mounting device 28 is provided at one of spout 12 and spray head 14, wherein mounting device 28 includes distal end 30 having exterior groove 38.

At step S102, docking collar 16 is provided at the other of spout 12 and spray head 14, and is configured as described above, including annular channel 58 and at least one slot 54.

At step S104, spring ring 18 is positioned in annular channel 58.

At step S106, each protrusion 32 of mounting device 28 is positioned to a desired orientation with respect to a corresponding slot 54 of docking collar 16.

At step S108, distal end 30 of mounting device 28 is inserted into the interior opening 44 of docking collar 16, until spring ring 18 collapses into exterior groove 38 of mounting device 28. In this manner, the spring ring 18 is forced to expand diametrically, and then spring back to its original shape upon contact with exterior groove 38. This creates a "clicking" noise which indicates to a user that the docking of spray head 14 with spout 12 is complete.

The interface of spring ring 18 and the top edge of external groove 38 provides a desired retaining force to keep spray head 14 mounted to spout 12 until the retaining force is overcome by a user applying pressure to, e.g., pulling, spray head 14 to remove spray head 14 from spout 12. This retaining force provides a tactile feedback to the user. In embodiments where spray head 14 remains attached to a water source via a flexible conduit when undocked, spray head 14 may be used as a wand until the task is complete, and then spray head 14 may be returned to the docked position as described above in step S108.

While this invention has been described with respect to embodiments of the invention, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A faucet, comprising:
   a spout having a first mounting device;
   a spray head having a second mounting device; and
   a docking collar for releasably mounting said spray head to said spout, said docking collar being connected to one of said first mounting device and said second mounting device, and said docking collar including a spring ring for releasably engaging a groove formed at an other of said first mounting device and said second mounting device, wherein said docking collar includes a body having an interior opening, a first plurality of protrusions, and an alternating plurality of slots formed around an inner periphery of said interior opening, and having an annular channel formed at an outer periphery of said body that extends to said plurality of slots, such that an interior circumference of said spring ring positioned in said annular channel extends into each of said plurality of slots to engage said groove.

2. The faucet of claim 1, wherein said spring ring is a split metal ring residing in an annular channel formed at a periphery of said docking collar.

3. The faucet of claim 1, wherein said other of said first mounting device and said second mounting device is sized for snug insertion into said interior opening and includes a second plurality of protrusions, and wherein said groove is formed in said second plurality of protrusions to form an exterior annular recess.

4. The faucet of claim 1, wherein said other of said first mounting device and said second mounting device includes a second plurality of protrusions, and wherein said first plurality of protrusions is interlaced with said second plurality of protrusions when said spray head is mounted to said spout.

5. The faucet of claim 4, wherein each of said first plurality of protrusions and said second plurality of protrusions include a tapered end to aid in interlacing said first plurality of protrusions with said second plurality of protrusions.

6. The faucet of claim 1, wherein said docking collar includes at least one slot and said spray head includes at least one protrusion, said at least one protrusion engaging said at least one slot when said spray head is mounted to said spout to clock said spray head to a desired rotational position with respect to said spout.

7. The faucet of claim 1, wherein said docking collar includes at least one protrusion and said spray head includes at least one slot, said at least one protrusion engaging said at least one slot when said spray head is mounted to said spout to clock said spray head to a desired rotational position with respect to said spout.

8. The faucet of claim 1, said docking collar including a first plurality of protrusions and at least one of said spray head and said spout including a second plurality of protrusions, wherein when said spray head is mounted to said spout said first plurality of protrusions are interlaced with said second plurality of protrusions to clock said spray head to a desired position.

9. The faucet of claim 8, wherein said groove is formed in said second plurality of protrusions as an exterior annular recess.

10. The faucet of claim 9, wherein said spray head includes an adapter, said adapter including said second plurality of protrusions and said exterior annular recess.

11. The faucet of claim 9, wherein said docking collar has an interior opening defined by said first plurality of protrusions and an alternating plurality of slots, and having an annular channel formed at a periphery of said docking collar for receiving said spring ring, wherein an interior circumference of said spring ring extends into each of said plurality of slots to engage said exterior annular recess.

12. The faucet of claim 11, wherein said spring ring is a split metal ring.

13. A kit for releasably mounting a spray head to a spout comprising:
    a first device having a first end and a second end, said first end having a first connector for connecting to one of said spray head and said spout, and said second end including an exterior groove;
    a second device having a second connector for connecting to an other of said spray head and said spout, said second device having an outer periphery and an interior opening defined by at least one slot, said second device having an annular channel formed at said outer periphery that extends to said at least one slot, said interior opening being defined by a first plurality of protrusions and an alternating plurality of slots, and said annular channel formed at said outer periphery extends to said plurality of slots; and
    a spring ring for insertion into said annular channel, wherein an interior circumference of said spring ring extends into said at least one slot with a compressive force to engage said exterior groove of said first device when said first device and said second device are docked.

14. A method for releasably mounting a spray head to a spout, comprising:
    providing a first device at one of said spray head and said spout, said first device having a distal end having an exterior groove;
    providing a second device at an other of said spray head and said spout, said second device having an outer periphery and an interior opening defined by at least one slot, said second device having an annular channel formed at said outer periphery that extends to said at least one slot;
    positioning a spring ring in said annular channel; and
    inserting said distal end of said first device into said interior opening of said second device until said spring ring collapses into said exterior groove of said first device;
    wherein said interior opening is defined by a first plurality of protrusions and an alternating plurality of slots, and said annular channel formed at said outer periphery extends to said plurality of slots, and said distal end of said first device includes a second plurality of protrusions, the method further comprising:
    positioning said second plurality of protrusions to a desired orientation with respect to said plurality of slots prior to inserting said distal end of said first device into said interior opening of said second device.

* * * * *